(12) United States Patent
Yoshioka et al.

(10) Patent No.: US 11,902,698 B2
(45) Date of Patent: Feb. 13, 2024

(54) DISPLAY APPARATUS

(71) Applicant: Sony Group Corporation, Tokyo (JP)

(72) Inventors: Hiroshi Yoshioka, Kanagawa (JP);
Tomohiro Suzuki, Kanagawa (JP);
Daisuke Miki, Tokyo (JP); Masao Zen,
Chiba (JP); Tetsuo Ikeyama, Kanagawa
(JP)

(73) Assignee: Sony Group Corporation

( * ) Notice: Subject to any disclaimer, the term of this patent is extended or adjusted under 35 U.S.C. 154(b) by 192 days.

(21) Appl. No.: 17/628,443

(22) PCT Filed: Jul. 17, 2020

(86) PCT No.: PCT/JP2020/027788
§ 371 (c)(1),
(2) Date: Jan. 19, 2022

(87) PCT Pub. No.: WO2021/020157
PCT Pub. Date: Feb. 4, 2021

(65) Prior Publication Data
US 2022/0272299 A1 Aug. 25, 2022

(30) Foreign Application Priority Data
Jul. 31, 2019 (JP) .................. 2019-140676

(51) Int. Cl.
*H04R 1/02* (2006.01)
*H04N 5/60* (2006.01)
(Continued)

(52) U.S. Cl.
CPC ................ *H04N 5/60* (2013.01); *G09G 3/20* (2013.01); *G09G 3/3208* (2013.01); *G09G 5/10* (2013.01);
(Continued)

(58) Field of Classification Search
CPC .......... H04N 5/60; G09G 5/10; G09G 3/3208; G09G 3/20; G09G 2320/041; G09G 2320/0285; G09G 2320/0233
(Continued)

(56) References Cited

U.S. PATENT DOCUMENTS 8,774,419 B2 7/2014 Risbo et al.
9,807,528 B1 10/2017 Jensen et al.
(Continued)

FOREIGN PATENT DOCUMENTS

JP 2009276744 A 11/2009
JP 2009302924 A 12/2009
(Continued)

OTHER PUBLICATIONS

International Search Report for PCT/JP2020/027788 dated Oct. 20, 2020, 3 pgs.

*Primary Examiner* — Ammar T Hamid
(74) *Attorney, Agent, or Firm* — Lerner David LLP

(57) ABSTRACT

The present technology relates to a display apparatus that can more reliably suppress effects of heating.
Provided is a display apparatus that includes a signal processing section, a panel section, and a vibration section. The signal processing section processes a video image signal and a sound signal. The panel section is in a plate shape and displays a video image corresponding to the video image signal. The vibration section is arranged on a back face side of the panel section and vibrates the panel section according to the sound signal. The signal processing section calculates a correction value for suppressing an amount of light emitted by the panel section on the basis of the sound signal and controls a level of the video image signal on the basis of the calculated correction value. The present technology is applicable, for example, to a television receiver.

12 Claims, 16 Drawing Sheets

(51) Int. Cl.
  *G09G 3/3208* (2016.01)
  *G09G 3/20* (2006.01)
  *G09G 5/10* (2006.01)

(52) U.S. Cl.
  CPC ............... *G09G 2320/0233* (2013.01); *G09G 2320/0285* (2013.01); *G09G 2320/041* (2013.01)

(58) Field of Classification Search
  USPC .................................................. 381/333, 334
  See application file for complete search history.

(56) References Cited

U.S. PATENT DOCUMENTS

| | | |
|---|---|---|
| 2008/0212306 A1 | 9/2008 | Huang et al. |
| 2018/0270570 A1* | 9/2018 | Choi ...................... H04R 1/323 |
| 2019/0028787 A1 | 1/2019 | Masuda et al. |

FOREIGN PATENT DOCUMENTS

| | | |
|---|---|---|
| JP | 2018093469 A | 6/2018 |
| WO | 2018123292 A1 | 7/2018 |

\* cited by examiner

| 0 | 0 | 0 | 0 | 0 |
|---|---|---|---|---|
| 0 | 1 | 2 | 1 | 0 |
| 1 | 6 | 8 | 6 | 1 |
| 3 | 10 | 15 | 10 | 3 |
| 1 | 6 | 8 | 6 | 1 |
| 0 | 1 | 2 | 1 | 0 |
| 0 | 0 | 0 | 0 | 0 |

B

| 1.00 | 1.00 | 1.00 | 1.00 | 1.00 |
|------|------|------|------|------|
| 1.00 | 0.98 | 0.97 | 0.98 | 1.00 |
| 0.98 | 0.91 | 0.87 | 0.91 | 0.98 |
| 0.95 | 0.84 | 0.77 | 0.84 | 0.95 |
| 0.98 | 0.91 | 0.87 | 0.91 | 0.98 |
| 1.00 | 0.98 | 0.97 | 0.98 | 1.00 |
| 1.00 | 1.00 | 1.00 | 1.00 | 1.00 |

DISPLAY APPARATUS

CROSS-REFERENCE TO RELATED APPLICATIONS

This application is a national phase entry under 35 U.S.C. § 371 of International Application No. PCT/JP2020/027788 filed Jul. 17, 2020, which claims the priority from Japanese Patent Application No. 2019-140676 filed in the Japanese Patent Office on Jul. 31, 2019, the entire contents of which are hereby incorporated by reference.

TECHNICAL FIELD

The present technology relates to a display apparatus and particularly to a display apparatus that can more reliably suppress effects of heating.

BACKGROUND ART

In recent years, reduction in thickness and weight of a display has advanced. Also, a speaker has also become thinner and lighter in weight, and the use of a flat panel speaker (FPS) in place of a cone-shaped speaker has been proposed. Further, the use of a display panel as a diaphragm of the flat panel speaker has also been proposed.

In a display or a speaker of this type, there is a possibility that heating may affect its operation. Accordingly, countermeasures against heating are required. As technologies associated with countermeasures against heating, for example, those disclosed in PTL 1 to PTL 3 are known.

CITATION LIST

Patent Literature

[PTL 1]
U.S. Pat. No. 9,807,528
[PTL 2]
U.S. Pat. No. 8,774,419
[PTL 3]
JP 2009-276744A

SUMMARY

Technical Problem

However, the above technologies associated with countermeasures against heating are not sufficient as countermeasures associated with a flat panel speaker using a display panel as a diaphragm, and there has been a demand to reliably suppress impacts of heating.

The present technology has been devised in light of the foregoing circumstances, and it is an object of the present technology to more reliably suppress effects of heating.

Solution to Problem

A display apparatus of an aspect of the present technology is a display apparatus that includes a signal processing section adapted to process a video image signal and a sound signal, a panel section in a plate shape that is adapted to display a video image corresponding to the video image signal, and a vibration section arranged on a back face side of the panel section that is adapted to vibrate the panel section according to the sound signal, in which the signal processing section calculates a correction value for suppressing an amount of light emitted by the panel section, on the basis of the sound signal and controls a level of the video image signal on the basis of the calculated correction value.

In a display apparatus of an aspect of the present technology, a signal processing section adapted to process a video image signal and a sound signal, a panel section in a plate shape that is adapted to display a video image corresponding to the video image signal, and a vibration section arranged on a back face side of the panel section that is adapted to vibrate the panel section according to the sound signal are included, and the signal processing section calculates a correction value for suppressing an amount of light emitted by the panel section on the basis of the sound signal and controls a level of the video image signal on the basis of the calculated correction value.

It should be noted that the display apparatus of an aspect of the present technology may be an independent apparatus or an internal block included in a single apparatus.

BRIEF DESCRIPTION OF DRAWINGS

FIG. 15 depicts diagrams each illustrating an example of a relation between a temperature map and a gain map.

DESCRIPTION OF EMBODIMENT

A description will be given below of an embodiment of the present technology with reference to drawings. It should be noted that the description will be given in the following order.

1. Embodiment of Present Technology
2. Modification Example

1. Embodiment of Present Technology

Configuration Example of Display Apparatus

Figure 1:
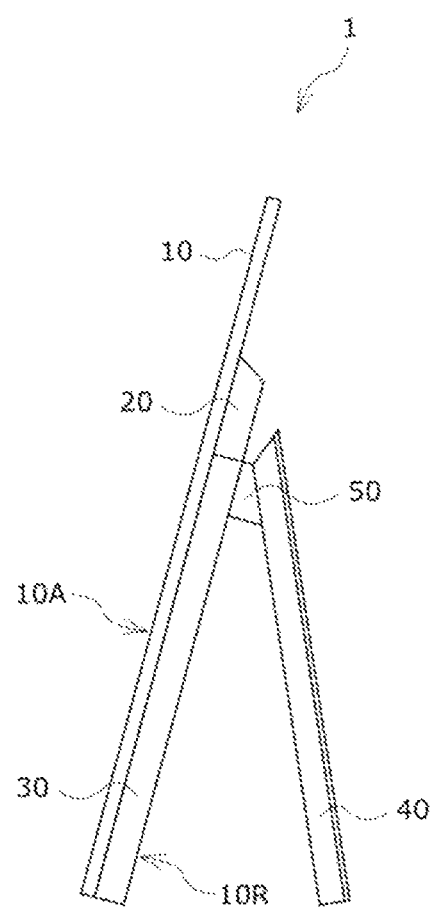
FIG. 1 is a diagram illustrating an example of a lateral face configuration of a display apparatus to which the present technology is applied.
Figure 2:
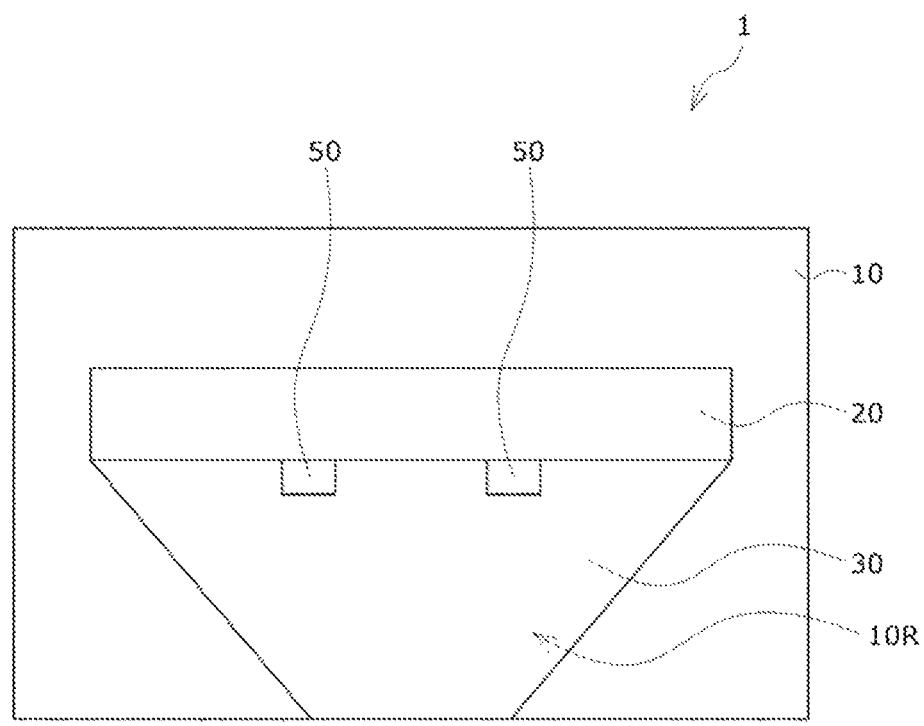
FIG. 2 is a diagram illustrating an example of a rear face configuration of the display apparatus to which the present technology is applied.

FIG. 1 illustrates an example of a lateral face configuration of a display apparatus 1 as a configuration example of an embodiment of a display apparatus to which the present technology is applied. Also, FIG. 2 illustrates an example of a rear face configuration of this display apparatus 1.

The display apparatus 1 is configured as a television receiver or the like. The display apparatus 1 displays a video image on a video image display surface 10A and outputs a sound from the video image display surface 10A. That is, the display apparatus 1 incorporates a flat panel speaker.

The display apparatus 1 includes a panel section 10 and a vibration section 20. The panel section 10 not only displays a video image but also functions as a diaphragm. The vibration section 20 is arranged on a back face of the panel section 10 to vibrate the panel section 10. The display apparatus 1 further includes a signal processing section 30 and a support section 40. The signal processing section 30 controls the panel section 10 and the vibration section 20. The support section 40 supports the panel section 10 via a rotation section 50.

The vibration section 20 and the signal processing section 30 are arranged on the back face of the panel section 10. The panel section 10 has a rear cover 10R for protecting the vibration section 20 and the signal processing section 30 on the back face side of the panel section 10. The rear cover 10R includes a plate-shaped metallic plate, resin plate, or the like and is connected to the rotation section 50.

Figure 3:
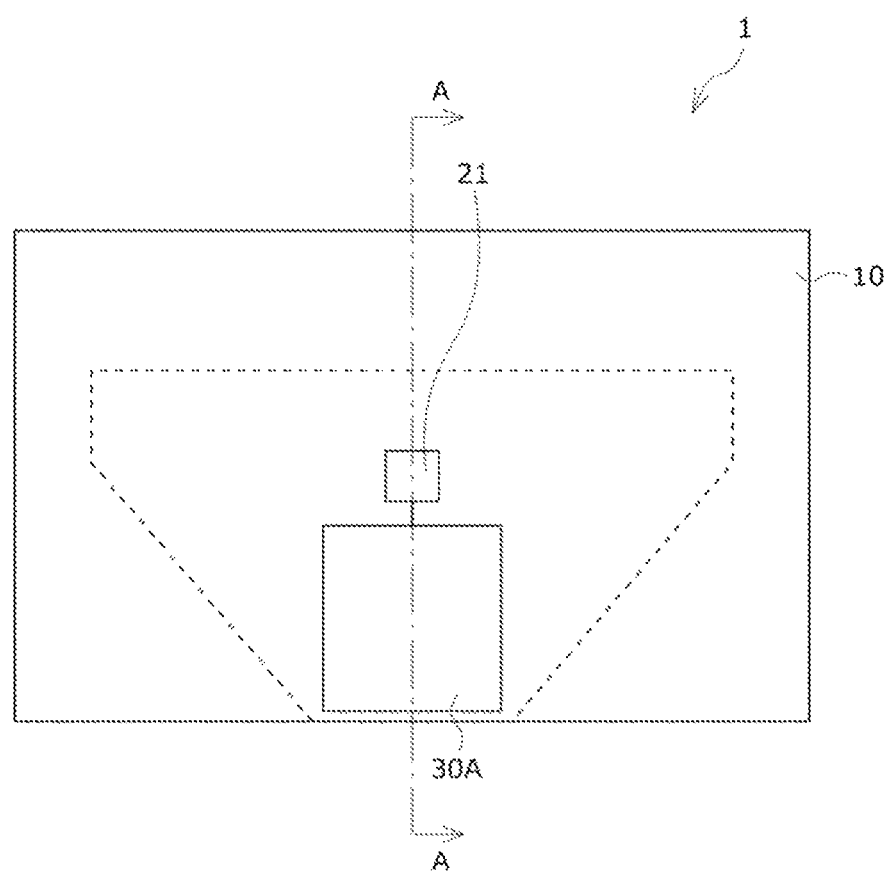
FIG. 3 is a diagram illustrating an example of a rear face configuration of the display apparatus with a back chassis removed.
Figure 4:
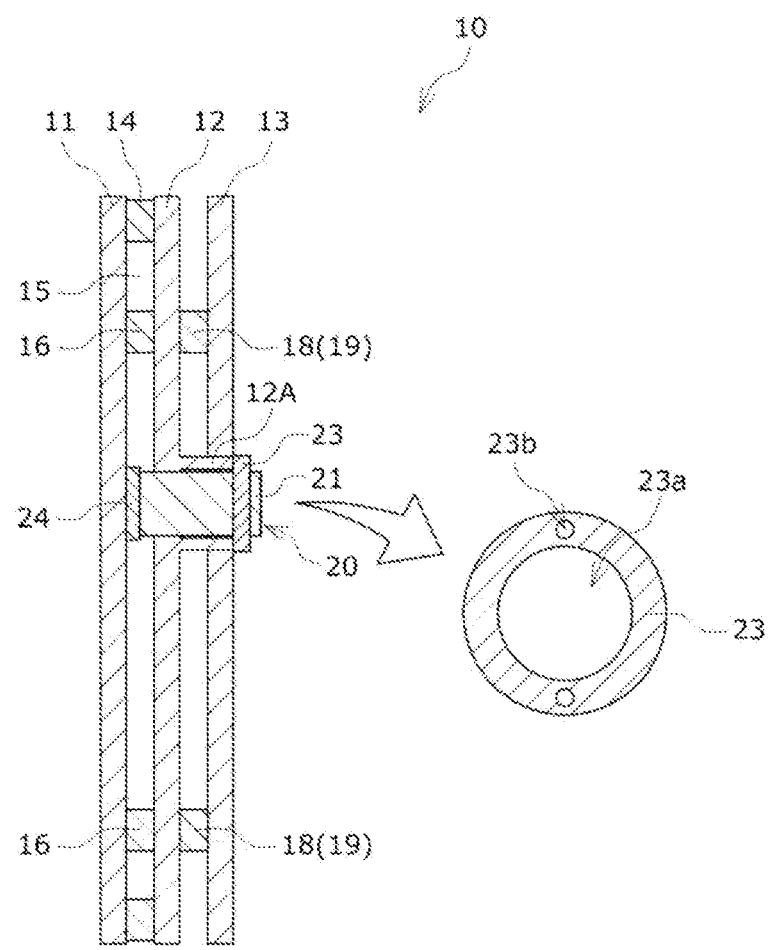
FIG. 4 is a diagram illustrating a cross-sectional configuration of major parts along line A-A in FIG. 3.

FIG. 3 illustrates an example of a rear face configuration of the display apparatus 1 with the rear cover 10R removed. FIG. 3 illustrates a circuit substrate 30A corresponding to the signal processing section 30. Also, FIG. 4 illustrates a cross-sectional configuration of major parts along line A-A in FIG. 3. It should be noted that the detailed configuration of the signal processing section 30 will be described later with reference to FIG. 5.

The panel section 10 has a display cell 11 in the shape of a thin plate that displays a video image, an inner plate 12 (opposed plate) arranged to be opposed to the display cell 11 via a gap 15, and a back chassis 13.

A front face of the display cell 11 (face on the opposite side of the vibration section 20) is the video image display surface 10A. The panel section 10 further has a fastening member 14 between the display cell 11 and the inner plate 12.

The fastening member 14 is arranged along an outer edge of the display cell 11 and has both a function to fasten the display cell 11 and the inner plate 12 together and a function as a spacer to maintain the gap 15.

The inner plate 12 is a substrate for supporting a vibrator 21. The inner plate 12 has an opening for a vibrator at a location where the vibrator 21 is provided.

The vibration section 20 has a vibrator 21. The vibrator 21 is arranged at substantially the center in the horizontal direction when the display cell 11 is viewed from the back face side, and arranged at substantially the center in the vertical direction.

The back chassis 13 has higher rigidity than the inner plate 12 and plays a role of suppressing deflection and vibration of the inner plate 12. Also, the back chassis 13 has an opening at a position opposed to the opening of the inner plate 12 (e.g., the opening for a vibrator). Of the opening provided in the back chassis 13, the opening provided at the position opposed to the opening for a vibrator has a size allowing the vibrator 21 to be inserted therein.

The vibrator 21 is an actuator for a speaker that has, for example, a voice coil, a bobbin around which the voice coil is wound, and a magnetic circuit and serves as a vibration source.

When a sound current of an electric signal flows through the voice coil, the vibrator 21 generates a driving force on the voice coil according to a principle of electromagnetic action. This driving force is transmitted to the display cell 11 via a vibration transmitting member 24 to be described later, causes vibration according to a change in sound current, causes air to vibrate, and changes a sound pressure.

The vibration section 20 has a fastening section 23 and the vibration transmitting member 24 for the vibrator 21. The fastening section 23 has an opening 23a and a plurality of threaded holes 23b. The opening 23a fastens the vibrator 21 with the vibrator 21 inserted therein. The plurality of threaded holes 23b are provided for insertion of screws that are used when the fastening section 23 is fastened to a protruding portion 12A. The vibrator 21 is fastened to the inner plate 12 via the fastening section 23.

The vibration transmitting member 24 is, for example, in contact with the back face of the display cell 11 and the bobbin of the vibrator 21 and fastened to the back face of the display cell 11 and the bobbin of the vibrator 21. The vibration transmitting member 24 includes at least a member that has a characteristic of rebounding in a sound wave region (20 Hz or higher).

The panel section 10 has a damping member 16 between the display cell 11 and the inner plate 12. The damping member 16 has an action of hindering vibrations produced in the display cell 11 by the vibrator 21 from interfering with each other.

The panel section 10 further has an adhesive layer 18 or a sticky layer 19 arranged between the inner plate 12 and the back chassis 13. The adhesive layer 18 or the sticky layer 19 is a layer for fastening the inner plate 12 and the back chassis 13 together.

Configuration Example of Signal Processing Section

Figure 5:
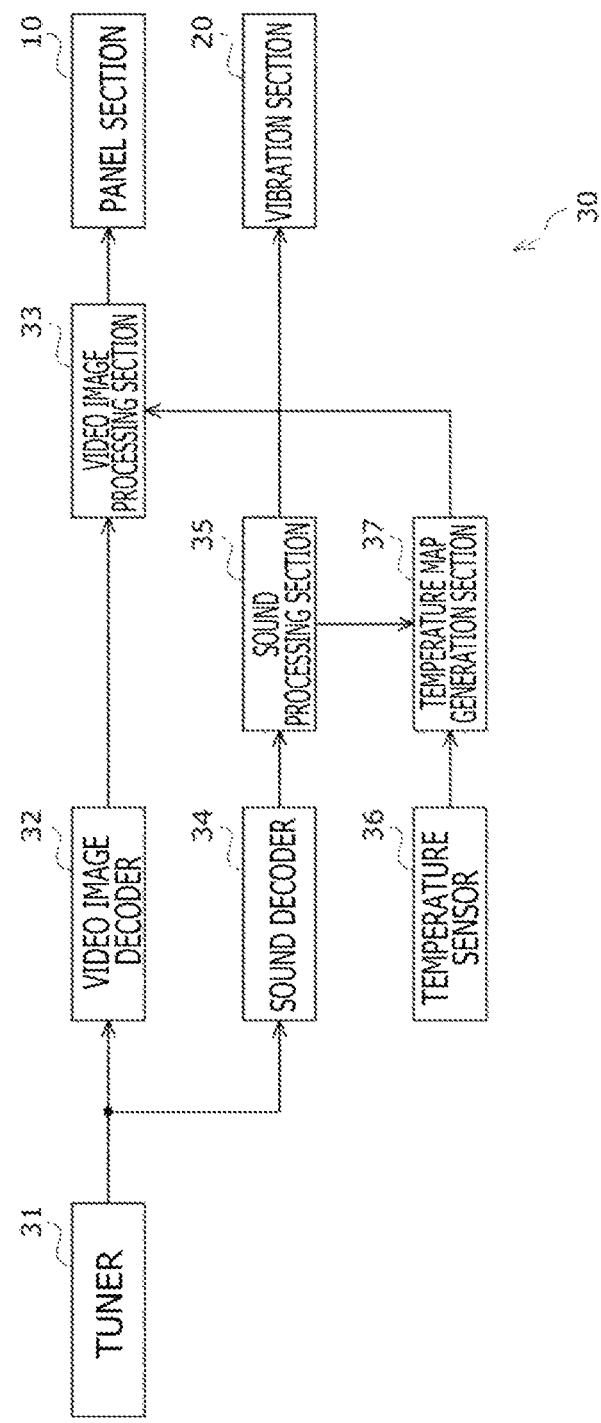
FIG. 5 is a diagram illustrating a configuration example of a signal processing section.

FIG. 5 illustrates a configuration example of the signal processing section 30.

In FIG. 5, the signal processing section 30 includes a tuner 31, a video image decoder 32, a video image processing section 33, a sound decoder 34, a sound processing section 35, a temperature sensor 36, and a temperature map generation section 37.

The tuner 31 processes a broadcasting signal received by a receiving antenna (not illustrated) and extracts broadcasting streams corresponding to a channel selected by a user. The tuner 31 outputs, of the broadcasting streams extracted, a video image stream to the video image decoder 32 and a sound stream to the sound decoder 34.

The video image decoder 32 performs a decoding process on the video image stream input from the tuner 31 and outputs a video image signal acquired as a result of that process to the video image processing section 33.

The video image processing section 33 includes a panel driver and drives the panel section 10 (display cell 11 thereof) on the basis of the video image signal input from the video image decoder 32. This allows a video image according to the video image signal to be displayed on the panel section 10.

The sound decoder 34 performs a decoding process on the sound stream input from the tuner 31 and outputs a sound signal acquired as a result thereof to the sound processing section 35.

The sound processing section 35 includes a sound device driver and drives the vibration section 20 (vibrator 21 thereof) by amplifying the sound signal input from the sound decoder 34 and outputting the amplified sound signal to the vibration section 20. This allows the panel section 10 (display cell 11 thereof) to vibrate as a diaphragm of the flat panel speaker and a sound (audio) according to the sound signal to be output.

Also, the sound processing section 35 calculates a power value according to power consumed by the vibration section 20 configured as the flat panel speaker and outputs the power value to the temperature map generation section 37.

The temperature sensor 36 is provided inside or outside the display apparatus 1. The temperature sensor 36 measures an ambient temperature (outside temperature) and outputs a measurement result thereof (measured value of the ambient temperature) to the temperature map generation section 37.

The temperature map generation section 37 generates a temperature map on the basis of the power value input from the sound processing section 35 and the measured value input from the temperature sensor 36. The temperature map generation section 37 generates a gain map corresponding to a temperature map and outputs the gain map to the video image processing section 33.

The video image processing section 33 controls a level of the video image signal on the basis of the gain map input from the temperature map generation section 37. The video image processing section 33 drives the panel section (display cell 11 thereof) on the basis of the video image signal whose level has been adjusted according to the gain map.

The display apparatus 1 is configured as described above.

(Flow of Video Image Processing)

Figure 6:
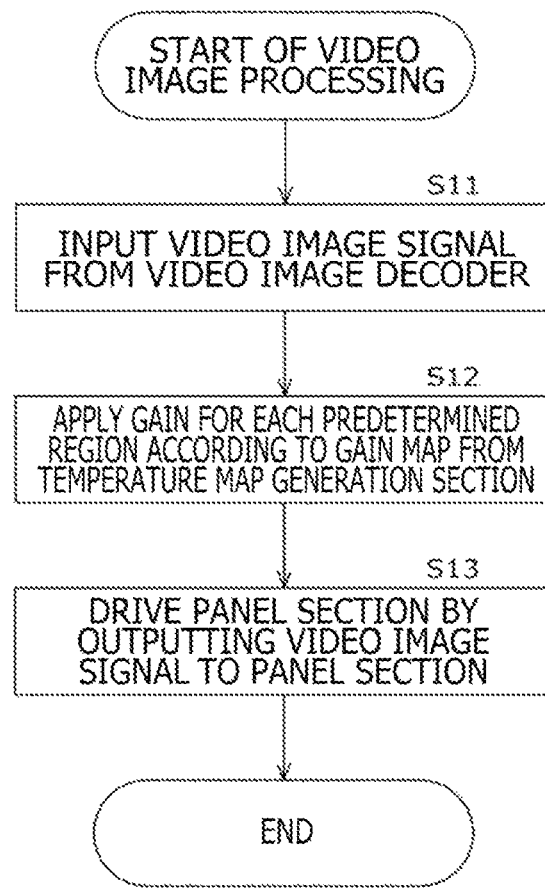
FIG. 6 is a flowchart explaining image processing.

A description will be given next of image processing performed by the video image processing section 33 in FIG. 5 with reference to the flowchart in FIG. 6.

A video image signal from the video image decoder 32 is input to the video image processing section 33 (S11).

The video image processing section 33 applies, according to the gain map from the temperature map generation section 37 and for each predetermined region of the panel section 10 (display cell 11 thereof), a gain to the video image signal corresponding to the region (S12). This allows the level of the video image signal to be adjusted for each predetermined region.

The video image processing section 33 drives the panel section 10 (display cell 11 thereof) by outputting, to the panel section 10, a video image signal whose level has been adjusted according to the gain map.

The flow of the video image processing has been described above.

This image processing applies, in a case where a video image quality is affected because of an increase in luminance of a specific region as a result of transfer of heat generated by the vibration section 20 (vibrator 21 thereof) to the panel section 10 (display cell 11 thereof), a gain to the video image signal for each predetermined region according to the gain map, which suppresses an increase in luminance of a specific region (suppresses an amount of light emitted by the display cell 11) and evens out the luminance of the entire screen region (provides the same luminance for the same video image signal). This makes it possible to suppress effects of heating of the vibration section 20 on the video image quality.

(Flow of Sound Processing)

A description will be given next of the flow of sound processing performed by the sound processing section 35 in FIG. 5 with reference to the flowchart in FIG. 7.

A sound signal from the sound decoder 34 is input to the sound processing section 35 (S21).

The sound processing section 35 calculates the power value of the vibration section 20 included in the flat panel speaker and outputs the power value to the temperature map generation section 37 (S22).

Figure 8:
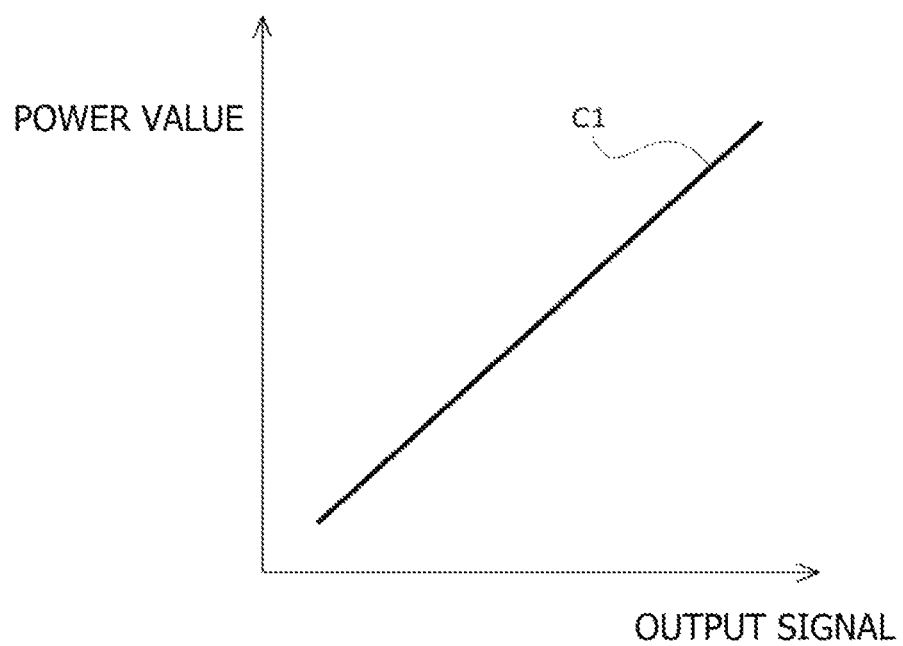
FIG. 8 is a diagram illustrating an example of a power value calculation method.

FIG. 8 illustrates an example of a power value calculation method in the process performed in step S22. FIG. 8 illustrates, when a sound signal (output signal) output from the sound processing section 35 to the vibration section 20 is plotted along a horizontal axis and a power value of the vibration section 20 is plotted along a vertical axis, a graph C1 representing a relation between the output signal and the power value.

In FIG. 8, in a case where the relation between the output signal and the power value is represented by the graph C1 of a predetermined function, it is possible to calculate the power value from the output signal by substituting a value according to the output signal into a variable of the function and solving the calculation formula.

Also, it is possible, by retaining, in advance, power values corresponding to output signals as a lookup table (LUT), to refer to the lookup table and obtain a power value corresponding to an output signal.

As described above, the power value of the vibration section 20 is obtained by solving the calculation formula of a predetermined function or referring to a lookup table. Here, it becomes possible, by retaining a lookup table in advance, to specify a finer value as a power value. It should be noted that a power value can be converted into heat and includes a current value according to a current flowing through the vibration section 20 or a voltage value according to a voltage.

Figure 7:
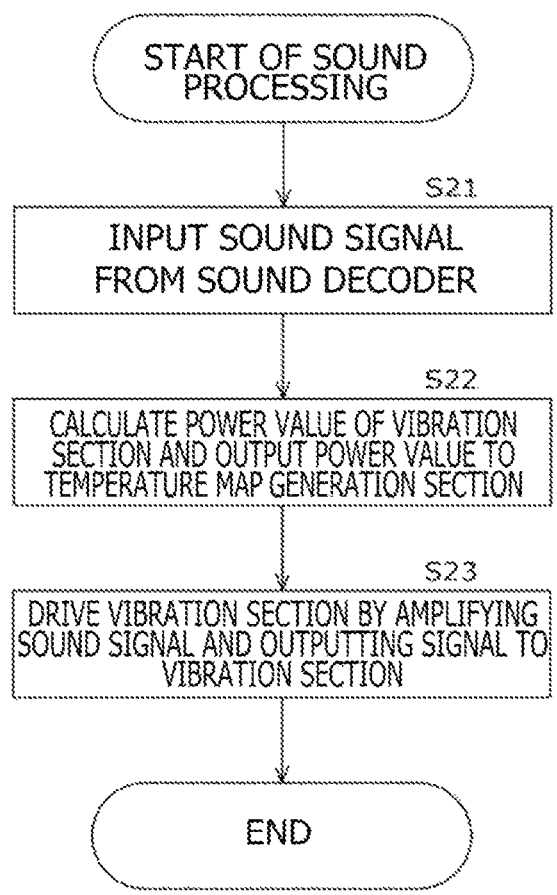
FIG. 7 is a flowchart explaining sound processing.

Referring back to the description of FIG. 7, the sound processing section 35 drives the vibration section 20 (vibrator 21 thereof) by amplifying a sound signal and outputting the amplified sound signal to the vibration section 20.

The flow of the sound processing has been described above.

This sound processing outputs, in a case where the video image quality is affected by an increase in luminance of a specific region as a result of transfer of heat generated by the vibration section 20 (vibrator 21 thereof) to the panel section 10 (display cell 11 thereof), a power value of the vibration section 20 included in the flat panel speaker to the temperature map generation section 37, which generates a gain map according to a temperature map.

(Flow of Temperature Map Generation Process)

A description will be given next of the flow of a temperature map generation process performed by the temperature map generation section 37 in FIG. 5 with reference to the flowchart in FIG. 9.

A power value from the sound processing section 35 is input to the temperature map generation section 37 (S31).

The temperature map generation section 37 performs the temperature map generation process (S32). This temperature map generation process generates a temperature map on the basis of the input power value and the ambient temperature acquired by the temperature sensor 36. The temperature map generation process will be described in detail later with reference to FIGS. 11 to 14.

When a temperature map to be output is generated by the process in step S32, the process proceeds to step S33.

The temperature map generation section 37 calculates a reverse correction value for suppressing an amount of light emitted by the panel section 10 (display cell 11 thereof) from the temperature map to be output (S33).

The temperature map generation section 37 outputs, to the video image processing section 33, a gain map of the correction value acquired from the calculated reverse correction value (S34).

Figure 10:
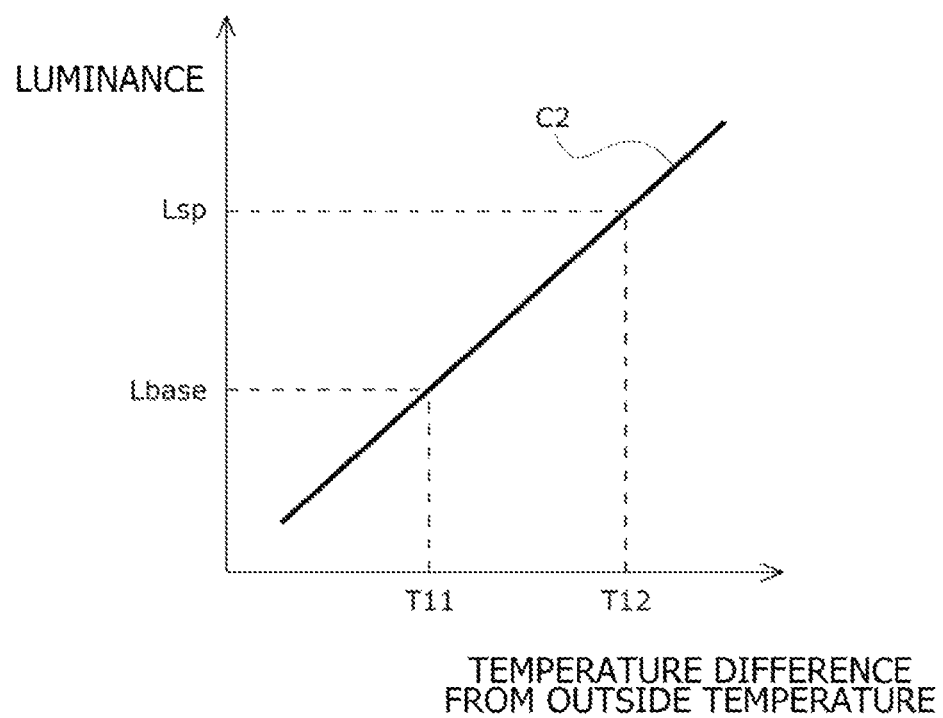
FIG. 10 is a diagram illustrating an example of a reverse correction value calculation method.

FIG. 10 illustrates an example of a reverse correction value calculation method in the process performed in step S33. FIG. 10 illustrates, when a temperature difference from an outside temperature is plotted along the horizontal axis and luminance (brightness of the screen) of the display cell 11 of the panel section 10 is plotted along the vertical axis, a graph C2 representing a relation between the temperature difference from the outside temperature and the luminance.

In FIG. 10, in a case where the relation between the temperature difference from the outside temperature and the luminance is represented by the graph C2 of a predetermined function, it is possible, for example, to substitute a temperature difference T11 and a temperature difference T12 into variables of the function as values indicating the temperature differences from the outside temperature. The temperature difference T11 is a temperature difference in a region corresponding to a portion of the panel section 10 where the vibration section 20 (vibrator 21 thereof) is not provided. The temperature difference T12 is a temperature difference in a region corresponding to a portion of the panel section 10 where the vibration section 20 (vibrator 21 thereof) is provided.

At this time, luminance Lbase is calculated by substituting the temperature difference T11 into a variable of the function, and luminance Lsp is calculated by substituting the temperature difference T12 into a variable of the function. Then, a gain of a correction value is obtained as a reverse correction value for suppressing an amount of light emitted by the panel section 10 (display cell 11 thereof) by substituting the luminance Lbase and the luminance Lsp into the following formula (1).

$$Gain = Lbase/Lsp \quad (1)$$

That is, if the temperature of the display cell 11 increases as a result of heating of the vibrator 21, the luminance of the display cell 11 increases according to the increase in temperature. Accordingly, if there is a temperature difference between the region corresponding to the portion of the display cell 11 where the vibrator 21 is provided and the region corresponding to the portion of the display cell 11 where the vibrator 21 is not provided, there will be a difference in luminance between these regions.

Accordingly, in the example in FIG. 10, a gain is obtained by using the above formula (1) to match the luminance of the region corresponding to the portion where the vibrator 21 is provided with the luminance of the region corresponding to the portion where the vibrator 21 is not provided. Then, it is possible, by using this gain as a correction value and controlling the level of the video image signal, to suppress the amount of light emitted by the display cell 11 in the region corresponding to the portion where the vibrator 21 is provided (region where the luminance increases) and to even out the luminance.

It should be noted that the luminance or gain may also be obtained here by retaining, in advance, the luminance or gain corresponding to the temperature difference from the outside temperature as a lookup table and referring to the lookup table.

As described above, a reverse correction value according to the temperature difference from the outside temperature is calculated for each predetermined region of the temperature map to be output (divided block obtained by dividing the screen of the panel section 10 by a predetermined division unit), and a gain map including a correction value (gain) for each predetermined region is generated.

The flow of the temperature map generation process has been described above.

This temperature map generation process generates, in a case where the video image quality is affected by an increase in luminance of a specific region as a result of transfer of heat generated by the vibration section 20 (vibrator 21 thereof) to the panel section 10 (display cell 11 thereof), a temperature map based on a power value from the sound processing section 35 and outputs a gain map corresponding to the temperature map to the video image processing section 33, which causes the video image processing section 33 to apply a gain to the video image signal for each predetermined region according to the gain map and suppresses the increase in luminance of a specific region.

A detailed description will be given here of the temperature map generation process corresponding to the process in step S32 in FIG. 9 with reference to the flowchart in FIG. 11.

The temperature map generation section 37 acquires a measured value of the ambient temperature (outside temperature) from the temperature sensor 36 (S41).

When the measured value of the ambient temperature is acquired by the process in step S41, the process proceeds to step S42.

The temperature map generation section 37 converts the power value input from the sound processing section 35 into a temperature increase and adds the converted value to the temperature map (S42).

Figure 12:
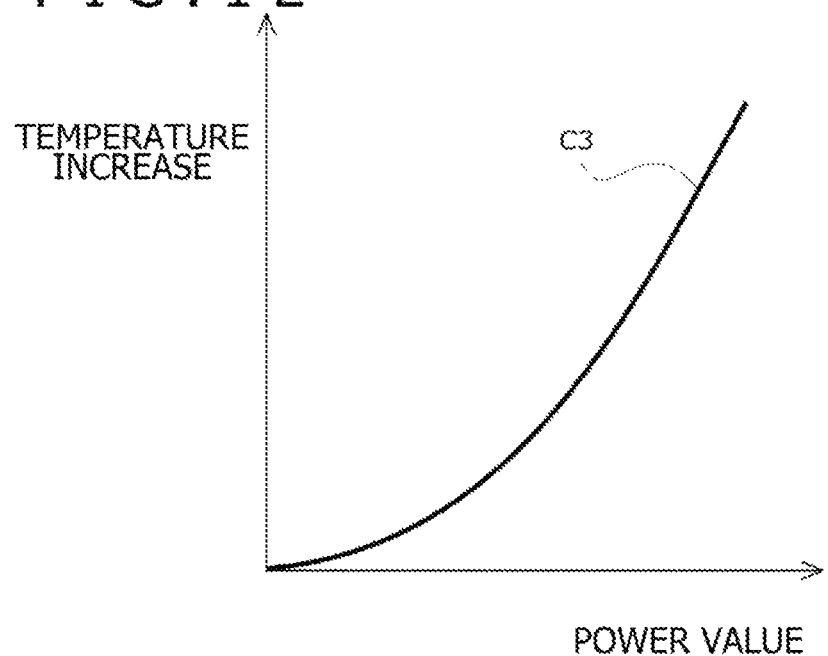
FIG. 12 is a diagram illustrating an example of a method of converting a power value into a temperature increase.

FIG. 12 illustrates an example of a method of converting a power value into a temperature increase in the process in step S42. FIG. 12 illustrates, when a power value of the vibration section 20 is plotted along the horizontal axis and a temperature increase is plotted along the vertical axis, a graph C3 representing a relation between the power value and the temperature increase.

In FIG. 12, in a case where the relation between the power value and the temperature increase is represented by the graph C3 of a predetermined function, the power value is converted into the temperature increase by substituting the power value into a variable of the function. Here, the temperature increase according to the power value is obtained for each predetermined region (divided block) of the temperature map.

It should be noted that the power value may also be converted into the temperature increase here by retaining, in advance, the temperature increase corresponding to the power value as a lookup table and referring to the lookup table. At this time, a plurality of lookup tables according to the ambient temperature or the like may be prepared. Alternatively, a coefficient may be applied to the lookup table.

Figure 11:
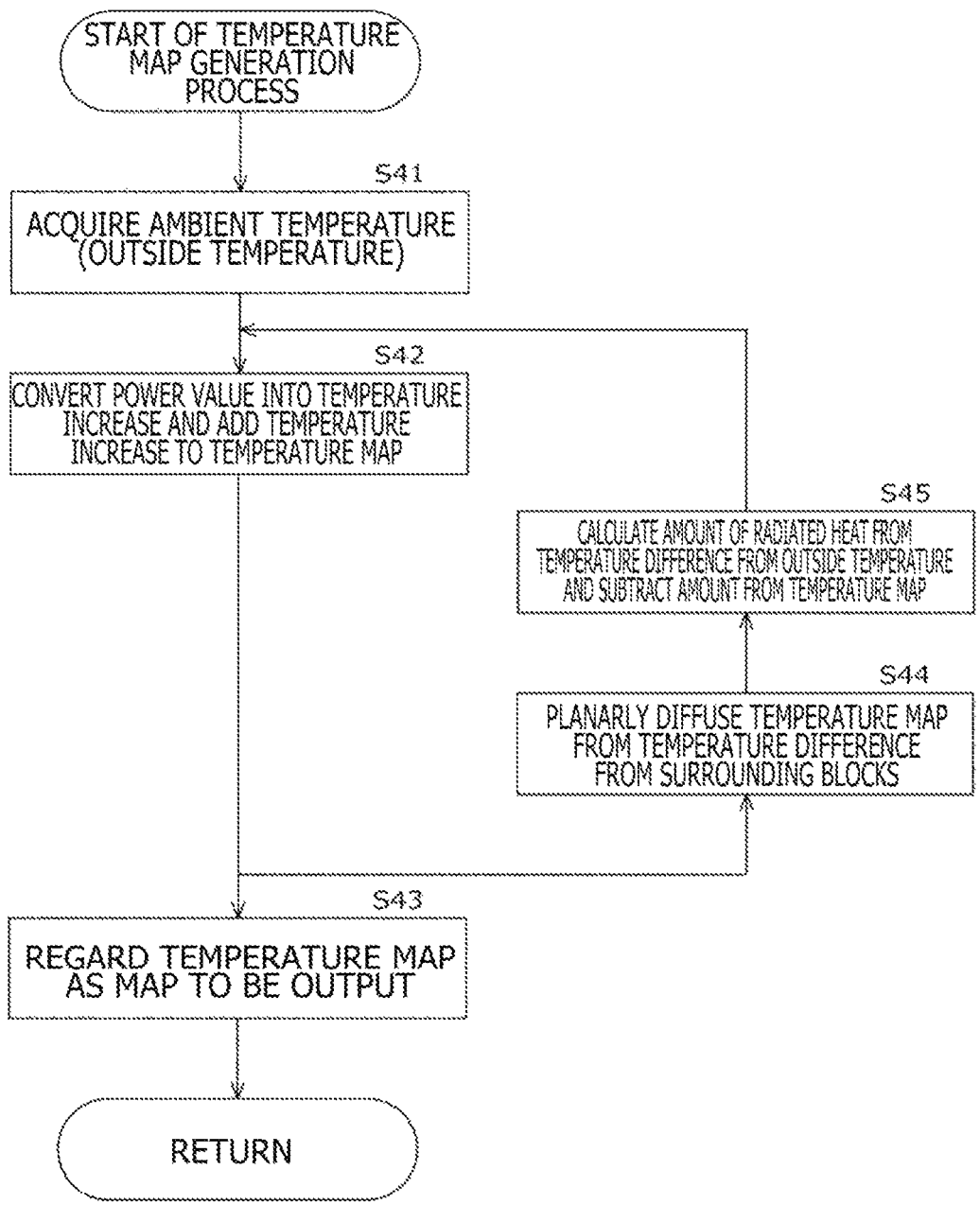
FIG. 11 is a flowchart explaining in detail a temperature map creation process.

Referring back to the description of FIG. 11, when the temperature increase is added to the temperature map in the process in step S42, the process proceeds to steps S43 and S44.

The temperature map generation section 37 treats the temperature map to which the temperature increase according to the power value has been added as a map to be output to the video image processing section 33 (S43).

Meanwhile, the temperature map generation section 37 planarly diffuses the temperature (heat) from the temperature difference between a divided block of interest on which attention is focused and surrounding divided blocks, in the temperature map (S44), and calculates an amount of radiated heat from the temperature difference from the outside temperature and subtracts the amount of radiated heat from the temperature map (S45).

Figure 13:
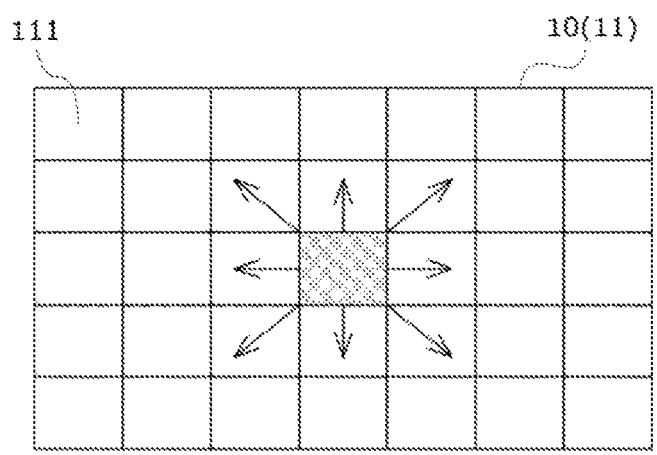
FIG. 13 is a diagram illustrating an example of planar diffusion of a temperature map.

FIG. 13 illustrates an example of planar diffusion of a temperature map in the process in step S44. In FIG. 13, of 35 divided blocks 111 obtained by dividing the screen of the panel section 10 vertically and horizontally into 5×7 portions, the divided block 111 at the center (dot pattern region in FIG. 13) is treated as the divided block 111 of interest, and the temperature (heat) is planarly diffused to the surrounding eight divided blocks 111 according to the temperature difference as illustrated by arrows that extend in eight directions therefrom.

At the time of this planar diffusion, for example, amounts of temperature (heat) diffused in a planar direction and temperature differences between the adjacent divided blocks 111 (temperature differences between the divided block of interest and the surrounding divided blocks thereof) over a unit time are calculated, and the amounts of planar diffusion are calculated according to the amounts of diffusion and the temperature differences between the adjacent divided blocks 111 over a unit time.

Figure 14:
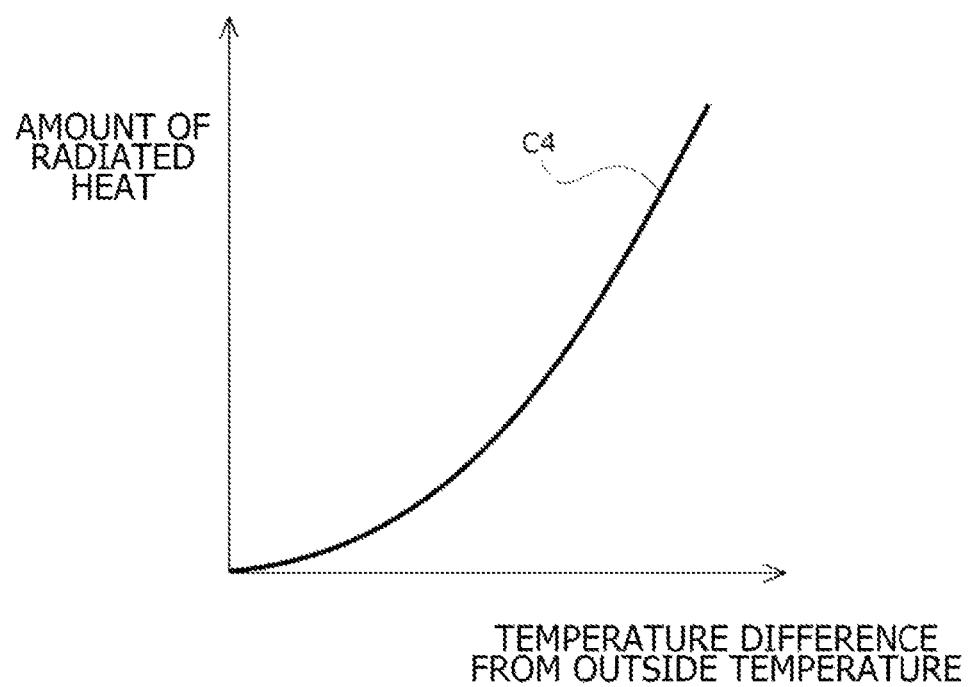
FIG. 14 is a diagram illustrating an example of a calculation method of an amount of radiated heat.

FIG. 14 illustrates an example of a calculation method of an amount of radiated heat in the process in step S45. FIG. 14 illustrates, when a temperature difference from the outside temperature is plotted along the horizontal axis and an amount of radiated heat is plotted along the vertical axis, a graph C4 representing a relation between the temperature difference from the outside temperature and the amount of radiated heat.

In FIG. 14, in a case where the relation between the temperature difference from the outside temperature and the amount of radiated heat is represented by the graph C4 of a predetermined function, the amount of radiated heat according to the temperature difference from the outside temperature is calculated by substituting the temperature difference from the outside temperature into a variable of the function.

It should be noted that the amount of radiated heat according to the temperature difference from the outside temperature may also be obtained here by retaining, in advance, the amount of radiated heat corresponding to the temperature difference from the outside temperature as the lookup table and referring to the lookup table.

Referring back to the description of FIG. 11, when the temperature map is planarly diffused and the amount of radiated heat is subtracted in the processes in steps S44 and S45, the process returns to step S42. Then, the temperature map generation section 37 adds the temperature increase according to the power value to the temperature map (S42) and treats the temperature map as a temperature map to be output (S43).

As described above, the temperature increase according to the power value of the vibration section 20 is added to the temperature map, the temperature map is planarly diffused, and the amount of radiated heat is subtracted with passage of time. Accordingly, the temperature map in which not only the temperature increase caused by heating of the vibration section 20 (vibrator 21 thereof) but also effects such as the amount of radiated heat according to the outside temperature are taken into account, every unit time, is generated and is treated as a temperature map to be output.

Figure 9:
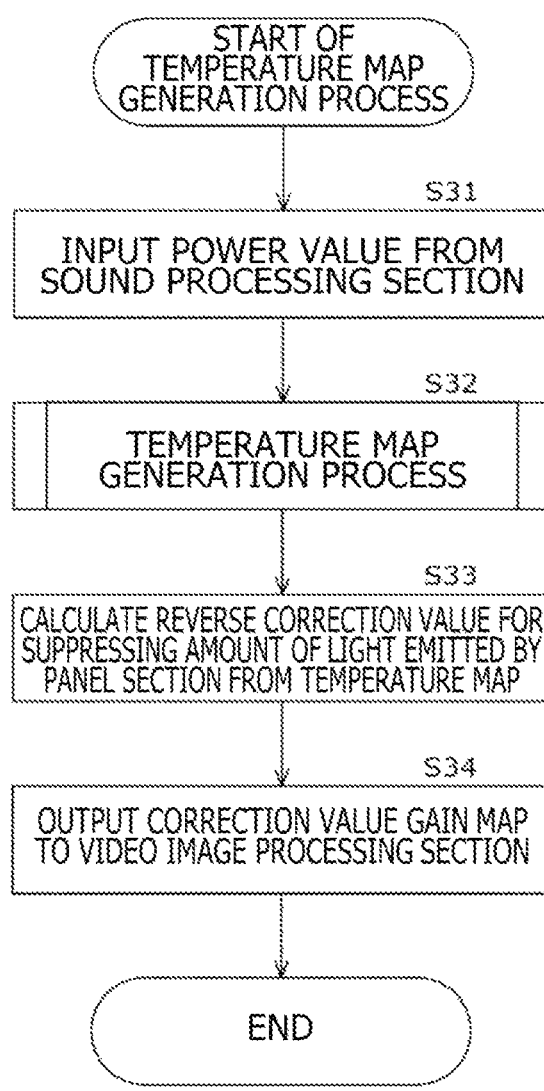
FIG. 9 is a flowchart explaining a temperature map generation process.

When the process in step S43 ends, the process returns to step S32 in FIG. 9, and the subsequent processes are performed.

It should be noted that the temperature map generation process illustrated in FIG. 11 is merely an example, and a temperature map may be generated by using another generation method.

Specifically, although a temperature map has been chronologically generated in FIG. 11 by repeating the addition of a temperature increase, the planar diffusion, and the subtraction of the amount of radiated heat through looping of steps S42, S44, and S45, the following generation method can be, for example, used without executing such looping. That is, the temperature map generation section 37 may calculate an integral value (integral power) obtained by integrating the power value of the vibration section 20 over a unit time and generate a temperature map on the basis of this integral value.

Here, the relation between the temperature map to be output that is generated by the process in step S32 in FIG. 9 and the gain map output by the process in step S34 in FIG. 9 is, for example, as illustrated in FIG. 15.

That is, the gain map in B of FIG. 15 is acquired from the temperature map in A of FIG. 15 by applying the reverse correction value calculation method illustrated in FIG. 10 to the process in step S33 in FIG. 9. It should be noted, however, that, in the example of A of FIG. 15, the position of the vibration section 20 (vibrator 21) relative to the panel section 10 (display cell 11) is indicated by a position P according to a dashed line circle in A of FIG. 15.

Although a numeric value according to the temperature is given in the temperature map for each divided block 111 in A of FIG. 15, this numeric value indicates a temperature increase in each divided block 111 in the example of A of FIG. 15.

The closer the divided block 111 to the position P of the vibration section 20, i.e., the center of the panel section 10, the larger the temperature increase (e.g., 15, 10, 8, or 6) in this example. Meanwhile, the more outward the divided block 111 is in the panel section 10, the smaller the temperature increase (e.g., 0, 1, 2).

A numeric value indicating a gain is given in the gain map for each divided block 111 in B of FIG. 15. In this example, the gain of each divided block 111 in the gain map of B of FIG. 15 is obtained by applying the reverse correction value calculation method illustrated in FIG. 10 to the temperature map in A of FIG. 15.

The closer the divided block 111 to the position P of the vibration section 20, i.e., the center of the panel section 10, the farther the gain value from 1.00 (e.g., 0.77, 0.87, 0.84, or 0.91) in this example. Meanwhile, the more outward the divided block 111 is in the panel section 10, the closer the gain value to 1.00 (e.g., 1.00, 0.98, or 0.97).

As described above, the closer the divided block is to the center of the panel section 10 where the temperature increase is larger, the smaller the gain value (farther from 1.00), and the outer the divided block is where the temperature increase is smaller, the larger the gain value (closer to 1.00). Accordingly, the video image processing section 33 applies a gain to the video image signal for each divided block 111 according to the gain map, which decreases the video image signal level of the region at high temperature, suppresses the increase in luminance of the region, and evens out the luminance of the entire screen region (provides the same luminance for the same video image signal).

Specifically, if attention is focused on the divided block 111 close to the center of the panel section 10 with a gain of 0.77 and the divided block 111 located outward in the panel section 10 with a gain of 1.00, the level of the video image signal is decreased in the former divided block 111. Accordingly, if the same video image signal is input, the luminance is the same. This makes it possible to suppress effects of heating of the vibration section 20 on the video image quality and improve the video image quality.

It should be noted that, although the screen of the panel section 10 has been divided into 5×7 portions and a gain has been calculated for each of the 5×7 divided blocks 111 in FIG. 15, a unit of division can be set as desired such as dividing the screen into even smaller portions and calculating a gain for each unit of division.

(Configuration with Plurality of Vibrators)

Figure 16:
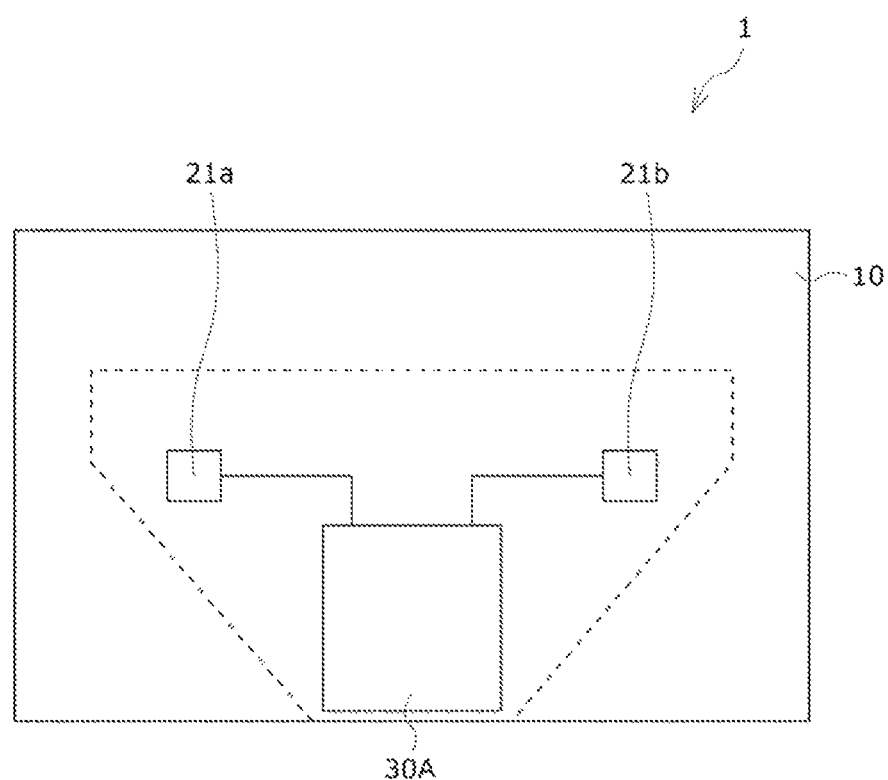
FIG. 16 is a diagram illustrating a configuration example of the rear face of the display apparatus in a case where a plurality of vibrators is provided.

Incidentally, although a case where the single vibrator 21 is provided in the vibration section 20 has been illustrated in the above description, it is also possible to provide the plurality of vibrators 21. FIG. 16 illustrates a configuration example of the rear face of the display apparatus 1 in a case where the two vibrators 21 are provided.

In FIG. 16, the vibration section 20 has two vibrators 21a and 21b. The vibrators 21a and 21b have a similar configuration to the vibrator 21 described above and have a configuration common to each other. That is, the vibrators 21a and 21b are speaker actuators each of which has, for example, a voice coil, a bobbin around which the voice coil is wound, and a magnetic circuit, to serve as a vibration source.

When the display cell 11 is seen from the back face side, the vibrator 21a is horizontally arranged closer to the left, and the vibrator 21b is arranged closer to the right. Also, both the vibrators 21a and 21b are vertically arranged approximately at the center.

Also in a case where the two vibrators 21a and 21b are provided, the temperature map generation process (FIG. 9) is performed similarly to the case where the single vibrator 21 is provided. However, it is assumed that the temperature maps have different distributions. The relation between the temperature map and the gain map in the case where the two vibrators 21a and 21b are provided is, for example, as illustrated in FIG. 17.

Figure 17:
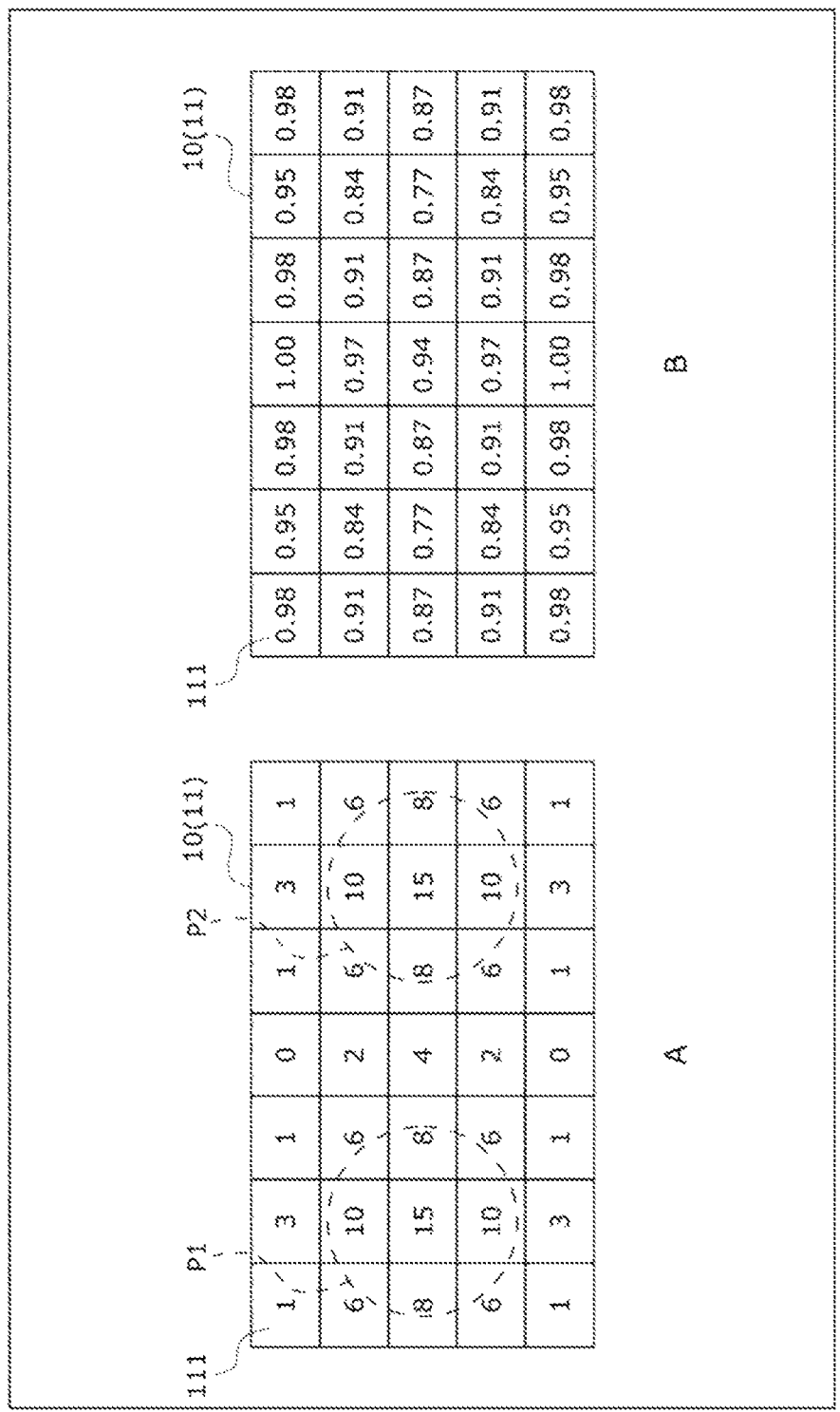
FIG. 17 depicts diagrams each illustrating an example of the relation between the temperature map and the gain map in the case where the plurality of vibrators is provided.

That is, the gain map in B of FIG. 17 is acquired from the temperature map in A of FIG. 17 by applying the reverse correction value calculation method illustrated in FIG. 10 to the process in step S33 in FIG. 9. It should be noted, however, that, in A of FIG. 17, the positions of the vibrators 21b and 21a relative to the panel section 10 (display cell 11) are indicated by positions P1 and P2 according to dashed line circles in A of FIG. 17.

In A of FIG. 17, the temperature map indicates a temperature increase in each divided block 111 by the numeric value given in each divided block 111.

In this example, as seen from the front face side of the display cell 11, the closer the divided block 111 to the center of the position P1 of the vibrator 21b arranged closer to the left, the larger the temperature increase (e.g., 15, 10, 8, or 6). Meanwhile, the farther the divided block 111 is from the center of the position P1, the smaller the temperature increase (e.g., 0, 1, or 2).

Also, as seen from the front face side of the display cell 11, the closer the divided block 111 to the center of the position P2 of the vibrator 21a arranged closer to the right, the larger the temperature increase (e.g., 15, 10, 8, or 6). Meanwhile, the farther the divided block 111 is from the center of the position P2, the smaller the temperature increase (e.g., 0, 1, or 2).

A numeric value indicating a gain is given in the gain map for each divided block 111 in B of FIG. 17. In this example, the gain of each divided block 111 in the gain map of B of FIG. 17 is obtained by applying the reverse correction value calculation method illustrated in FIG. 10 to the temperature map in A of FIG. 17.

In this example, the closer the divided block 111 to the center of the position P1 of the vibrator 21b arranged closer to the left, the farther the gain value from 1.00 (e.g., 0.77, 0.87, 0.84, or 0.91). Meanwhile, the farther the divided block 111 from the center of the position P1, the closer the gain value to 1.00 (e.g., 1.00, 0.98, or 0.97).

Also, the closer the divided block 111 to the center of the position P2 of the vibrator 21a arranged closer to the right, the farther the gain value from 1.00 (e.g., 0.77, 0.87, 0.84, or 0.91). Meanwhile, the farther the divided block 111 from the center of the position P2, the closer the gain value to 1.00 (e.g., 1.00, 0.98, or 0.97).

As described above, in the panel section 10, the closer the divided block is to the center of the position P1 or P2 where the temperature increase is larger, the smaller the gain value (farther from 1.00), and the farther the divided block is from the center of the position P1 or P2, the larger the gain value (closer to 1.00). Accordingly, the video image processing section 33 applies a gain to the video image signal for each divided block 111 according to the gain map, which decreases the video image signal level of the region with high temperature, suppresses the increase in luminance of the region, and evens out the luminance of the entire screen region. This makes it possible to suppress effects of heating of the vibration section 20 on the video image quality and improve the video image quality.

2. Modification Example

Although the case where the single vibrator 21 is provided (FIG. 3) and the case where the two vibrators 21a and 21b are provided (FIG. 16) have particularly been illustrated in the above description, the number of vibrators 21 is not limited to one or two, and the plurality of vibrators 21, i.e., three or more vibrators 21, can be used. Even in the case where the three or more vibrators 21 are provided, it is possible to generate a temperature map according to the three or more vibrators 21 by performing the temperature map generation process (FIG. 9).

Also, in the description above, the vibrator 21 which is a speaker actuator serving as a vibration source includes a voice coil, and if a sound current of an electric signal flows through the voice coil, the vibrator 21 generates a driving force on the voice coil in accordance with the principle of electromagnetic action. However, the vibrator 21 is not limited to a voice coil, and another actuator such as a voltage actuator may also be used.

Although it is assumed that also in the case where another actuator is used, heating caused by the other actuator affects the operation, it is possible to suppress such effects of heating by applying the present technology.

Although, in the above description, the case where the display apparatus 1 is a television receiver, the display apparatus 1 is not limited to this case and may be a personal computer, a tablet terminal, a smartphone, a mobile phone, a game console, a display unit, or other pieces of electronic equipment. Further, the display apparatus 1 may be a digital signage, a medical monitor, a business monitor for broadcasting station (monitor for professional use), a vehicle-mounted display, or the like.

Also, in the display apparatus 1, an OLED (Organic Light Emitting Diode) display section which is a display panel having pixels, each including a self-luminous element and arranged two-dimensionally, a CLED (Crystal Light Emitting Diode) display section using LEDs for pixels, a liquid crystal display section which is a display panel having pixels, each including a liquid crystal element and a TFT (Thin Film Transistor) element, arranged two-dimensionally, or the like can be used as the panel section 10.

Further, in the display apparatus 1, a communication circuit (communication module) that supports a predetermined communication scheme, HDMI (registered trademark) (High Definition Multimedia Interface), an interface that complies with a predetermined standard such as a USB (Universal Serial Bus), or the like may be provided in the display apparatus 1. As a result, the display apparatus 1 reproduces not only broadcast content received via the tuner 31 but also communication content streamed by a video delivery service (e.g., OTT (Over The Top) service) via a communication network such as the Internet and recorded content recorded by a recording unit (recording/reproduction unit).

Also, the signal processing section 30 in FIG. 5 may be configured as a standalone apparatus as a signal processing apparatus. At this time, the signal processing apparatus may not include some of the components such as the tuner 31, the video image decoder 32, the sound decoder 34, or the temperature sensor 36. Alternatively, the signal processing apparatus may include other components.

It should be noted that the temperature sensor 36 may be not only provided inside or outside the display apparatus 1 but also incorporated in the panel section 10 (display cell 11).

It should be noted that embodiments of the present technology are not limited to that described above and can be modified in various ways without departing from the gist of the present technology.

Also, the present technology can also have the following configurations.

(1)

A display apparatus including:

a signal processing section adapted to process a video image signal and a sound signal;

a panel section in a plate shape that is adapted to display a video image corresponding to the video image signal; and a vibration section arranged on a back face side of the panel section that is adapted to vibrate the panel section according to the sound signal, in which the signal processing section calculates a correction value for suppressing an amount of light emitted by the panel section on the basis of the sound signal and controls a level of the video image signal, on the basis of the calculated correction value.

(2)

The display apparatus of feature (1), in which the signal processing section calculates the correction value on the basis of a power value according to a sound signal output to the vibration section.

(3)

The display apparatus of feature (2), in which the signal processing section generates a temperature map on the basis of the power value and an ambient temperature of a surrounding region, generates a gain map of the correction value on the basis of the generated temperature map, and controls a level of the video image signal on the basis of the generated gain map.

(4)

The display apparatus of feature (3), in which the signal processing section calculates a reverse correction value for suppressing an amount of light emitted by the panel section, on the basis of the generated temperature map and generates the gain map on the basis of the calculated reverse correction value.

(5)

The display apparatus of feature (3) or (4), in which a temperature increase according to the power value is added to the temperature map and an amount of radiated heat according to the ambient temperature is subtracted therefrom with passage of time.

(6)

The display apparatus of any one of features (3) to (5), in which the signal processing section controls a level of the video image signal for each predetermined region of the panel section on the basis of the gain map.

(7)

The display apparatus of feature (4), in which the reverse correction value is a value according to a gain for matching luminance of a region corresponding to a portion of the panel section where the vibration section is provided with luminance of a region corresponding to a portion of the panel section where the vibration section is not provided.

(8)

The display apparatus of feature (2), in which the signal processing section generates a temperature map on the basis of an integral value obtained by integrating the power value over a unit time, generates a gain map of the correction value on the basis of the generated temperature map, and controls the level of the video image signal on the basis of the generated gain map.

(9)

The display apparatus of feature (8), in which the signal processing section controls the level of the video image signal for each predetermined region of the panel section on the basis of the gain map.

(10)

The display apparatus of any one of features (1) to (9), in which the vibration section includes one or a plurality of vibrators.

(11)

The display apparatus of any one of features (1) to (10), in which the signal processing section processes a video image signal and a sound signal of content.

(12)

The display apparatus of any one of features (1) to (11) configured as a television receiver.

REFERENCE SIGNS LIST

1: Display apparatus
10: Panel section
11: Display cell
20: Vibration section
21, 21a, 21b: Vibrators
30: Signal processing section
31: Tuner
32: Video image decoder
33: Video image processing section 34: Sound decoder
35: Sound processing section
36: Temperature sensor
37: Temperature map generation section
40: Support section
50: Rotation section

The invention claimed is:

1. A display apparatus comprising:
a signal processing section adapted to process a video image signal and a sound signal;
a panel section in a plate shape that is adapted to display a video image corresponding to the video image signal; and
a vibration section arranged on a back face side of the panel section that is adapted to vibrate the panel section according to the sound signal, wherein
the signal processing section calculates a correction value for suppressing an amount of light emitted by the panel section on a basis of the sound signal and controls a level of the video image signal, on a basis of the calculated correction value.

2. The display apparatus according to claim 1, wherein the signal processing section calculates the correction value on a basis of a power value according to a sound signal output to the vibration section.

3. The display apparatus according to claim 2, wherein the signal processing section generates a temperature map on a basis of the power value and an ambient temperature of a surrounding region, generates a gain map of the correction value on a basis of the generated temperature map, and controls a level of the video image signal on a basis of the generated gain map.

4. The display apparatus according to claim 3, wherein the signal processing section calculates a reverse correction value for suppressing an amount of light emitted by the panel section on the basis of the generated temperature map and generates the gain map on a basis of the calculated reverse correction value.

5. The display apparatus according to claim 4, wherein a temperature increase according to the power value is added to the temperature map and an amount of radiated heat according to the ambient temperature is subtracted therefrom with passage of time.

6. The display apparatus according to claim 3, wherein the signal processing section controls a level of the video image signal for each predetermined region of the panel section on the basis of the gain map.

7. The display apparatus according to claim 4, wherein the reverse correction value is a value according to a gain for matching luminance of a region corresponding to a portion of the panel section where the vibration section is provided with luminance of a region corresponding to a portion of the panel section where the vibration section is not provided.

8. The display apparatus according to claim 2, wherein the signal processing section generates a temperature map on a basis of an integral value obtained by integrating the power value over a unit time, generates a gain map of the correction value on a basis of the generated temperature map, and controls the level of the video image signal on a basis of the generated gain map.

9. The display apparatus according to claim 8, wherein the signal processing section controls the level of the video image signal for each predetermined region of the panel section on the basis of the gain map.

10. The display apparatus according to claim 1, wherein the vibration section includes one or a plurality of vibrators.

11. The display apparatus according to claim 1, wherein the signal processing section processes a video image signal and a sound signal of content.

12. The display apparatus according to claim 11 configured as a television receiver.

* * * * *